(12) United States Patent
Pomaranski et al.

(10) Patent No.: US 7,596,726 B2
(45) Date of Patent: Sep. 29, 2009

(54) METHOD AND APPARATUS FOR SELECTING A PRIMARY RESOURCE IN A REDUNDANT SUBSYSTEM

(75) Inventors: Ken Gary Pomaranski, Roseville, CA (US); Andrew Harvey Barr, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 11/263,431

(22) Filed: Oct. 31, 2005

(65) Prior Publication Data

US 2007/0101203 A1    May 3, 2007

(51) Int. Cl.
*G06F 11/00* (2006.01)
(52) U.S. Cl. ............................................ 714/47; 714/4
(58) Field of Classification Search ................... 714/47, 714/4
See application file for complete search history.

(56) References Cited

U.S. PATENT DOCUMENTS

| | | | |
|---|---|---|---|
| 5,485,634 A | 1/1996 | Weiser et al. | |
| 6,802,021 B1 * | 10/2004 | Cheng et al. | ................... 714/4 |
| 6,985,826 B2 | 1/2006 | Pomaranski | |
| 7,487,399 B2 | 2/2009 | Pomaranski et al. | |
| 2002/0065962 A1 * | 5/2002 | Bakke et al. | ................... 710/38 |
| 2003/0005119 A1 * | 1/2003 | Mercier et al. | ............... 709/225 |
| 2003/0023841 A1 * | 1/2003 | Atherton et al. | ................ 713/1 |
| 2003/0182504 A1 * | 9/2003 | Nielsen et al. | ............... 711/114 |
| 2004/0006615 A1 * | 1/2004 | Jackson | ....................... 709/223 |

FOREIGN PATENT DOCUMENTS

| | | |
|---|---|---|
| JP | 07-200482 | 8/1995 |
| JP | 11-191151 | 7/1999 |
| JP | 2001-236294 | 8/2001 |
| JP | 2001236294 A | 8/2001 |
| JP | 2005-135407 | 5/2005 |
| JP | 2005-141749 | 6/2005 |

OTHER PUBLICATIONS

"Translation of Japanese Office Action for Application 2006-290756", May 13, 2009.

* cited by examiner

*Primary Examiner*—Marc Duncan

(57) ABSTRACT

Embodiments of the invention provide a method and apparatus for selecting a primary resource in a redundant subsystem. In one method embodiment, the present invention receives a list of available resources for a redundant subsystem. Additionally, the available resources are tested and results of the testing are generated. Then, the primary resource is selected for the subsystem based on the results of the testing.

24 Claims, 5 Drawing Sheets

METHOD AND APPARATUS FOR SELECTING A PRIMARY RESOURCE IN A REDUNDANT SUBSYSTEM

TECHNICAL FIELD

The present invention generally relates to utility computing environments. More specifically to a system and method for selecting a primary resource in a redundant subsystem.

BACKGROUND ART

Modern networking continues to provide an improvement in communication and information access. As an example, in-house data centers, associated with a particular entity of interrelated group of users, could contain a large number of information technology (IT) resources that are interconnected through a network. These networks are configured in different ways depending on implementation-specific details such as the hardware used and the physical location of the equipment, and depending on the particular objectives of the network. One common type of network configuration is a local area network (LAN). In actual practice, a typical LAN will include large numbers of computer systems, switches, routers, load balancers, firewalls, and the like.

Many modern networks also include a plurality of redundant subsystems such as servers, disk logical units (LUNs) in a disk array, network switches in the LAN, and the like. In addition, a network may be organized in a virtual LAN (VLAN) including a plurality of the resources within the LAN network. In some cases, the collection of computational devices contained in these VLANs is referred to as farms. The network is referred to as a VLAN because the actual network (e.g., the wiring, cables, etc.) is not reconfigured, instead, the network will be virtually assigned (e.g., with the use of software) the resources specific to the VLAN. Thus, the physical network remains the same, but the actual utilization of the network can be divided into distinct LANs virtually.

For example, a user may request a farm including a server, a LUN, and two ports on a network switch. The network will then select, configure and deploy the computational devices to establish a farm of devices for the user. The user's farm would then be active as long as the user requested it and/or utilized it. After the user was finished with the farm, the resources would be reabsorbed into the resource pool to await reassignment.

During the set-up of the network, there may be a plurality of selectable redundant subsystems to be sorted into primary and secondary resources. In general, the primary resource is the first resource chosen when some action is required by the host system. For example, if there are two paths to a disk drive, the primary path is the one chosen first when there is a transaction required of the disk. However, currently the selection of the primary resource is based on a hardware or software convenience or by simple ordinal conventions. For example, if the set of resources are numbered or addressed as 0 to n, the normal default is to select the resource 0 as the primary resource. In the case where the resource 0 is not the best resource in the pool of resources, selecting 0 as the primary resource will deleteriously effect the operation of the subsystem and even the network.

This method of selecting primary resources based on device address is worse than even a random method of selecting. For example, since the primary resource selected is always the same resource, e.g., resource 0, if resource 0 is slow or error prone each primary resource selection will result in a slow or error prone system. Additionally, when the primary resource is error prone, the opportunity for an unscheduled switchover to a secondary system is increased. As is well known, unscheduled switchovers often result in loss of data, system downtime, system slowdown, and the like.

DISCLOSURE OF THE INVENTION

Embodiments of the invention provide a method and apparatus for selecting a primary resource in a redundant subsystem. In one method embodiment, the present invention receives a list of available resources for a redundant subsystem. Additionally, the available resources are tested and results of the testing are generated. Then, the primary resource is selected for the subsystem based on the results of the testing.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Figure 1:
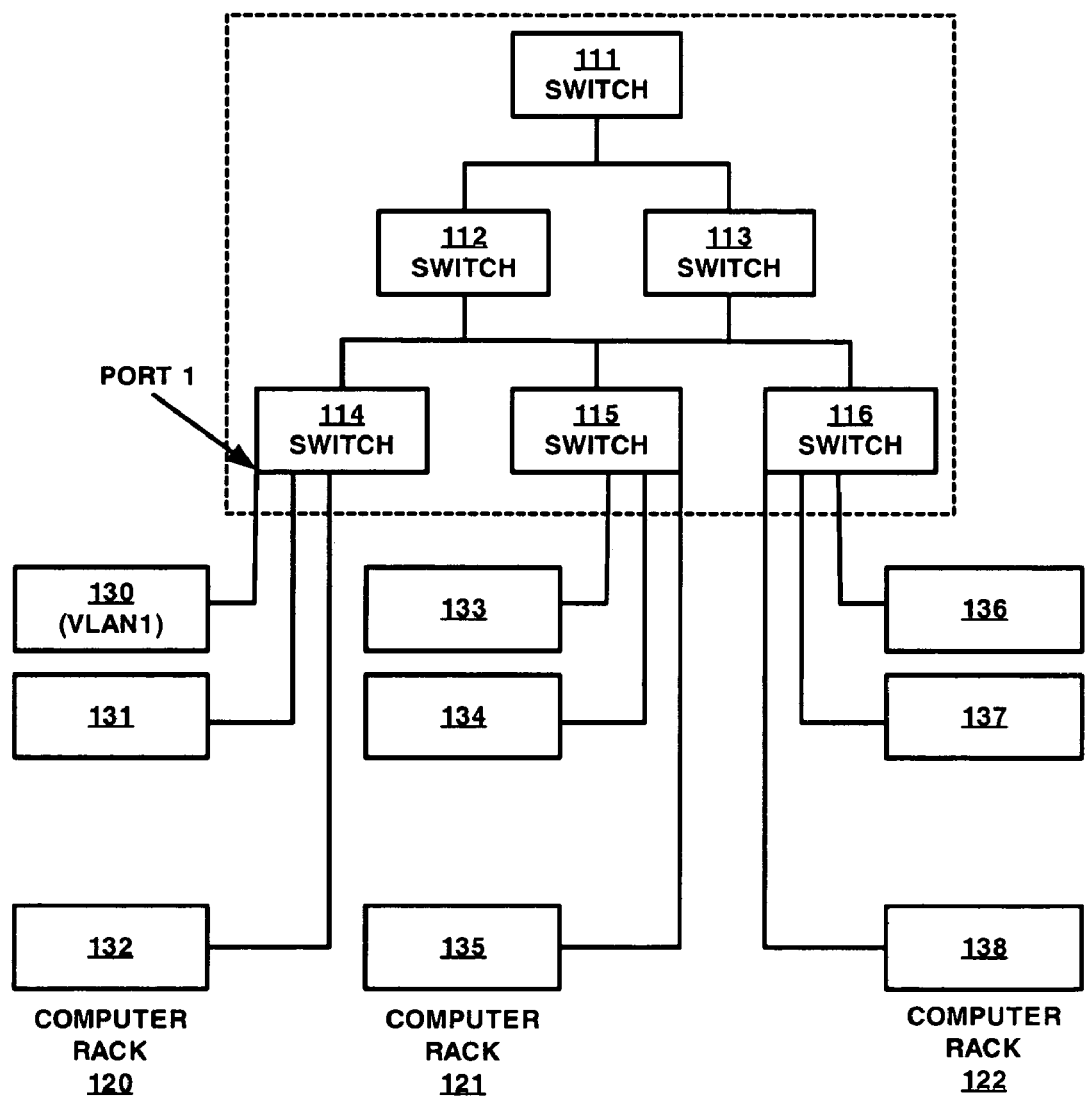
FIG. 1 is a block diagram of an exemplary LAN upon which embodiments of the present invention can be implemented.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Overview

Embodiments provide an automated method and apparatus for selecting a primary resource in a redundant subsystem. Embodiments further provide a method and apparatus for testing any or all of the available resources in a redundant subsystem for purposes of selecting the best resources as the primary resource. In one embodiment, a diagnostic routine is used to stress (or test) the resources in a similar manner and compare the results of the stress, or testing, to select the primary resource. In another embodiment, a state machine is used to stress the resources.

In general, a software and hardware based pattern test is used in conjunction with voltage and frequency variation. In another embodiment, the test is for only one or a couple of the pattern tests, e.g., voltage variation but not frequency variation, only high frequency variation, only low voltage variation, and the like. The resources are then ranked based on the results of the testing, wherein the resource with the highest quality ranking becomes the primary path and the remaining resources become the subordinate resources.

In one embodiment, the testing is performed at system boot. In another embodiment, the testing is performed at intervals throughout the system run time to ensure the primary resource remains the highest rated resource. In yet another embodiment, the testing is performed during system run time when new resources are added to the subsystem pool to ensure the primary resource remains the highest rated resource. By utilizing the embodiments described herein, a significant reduction in the potential for a resource switchover is realized. That is, since the best resource is initially selected as the primary resource, failure of the primary resource is reduced. In addition, since the test is performed during runtime, if a secondary resource is operating better than the primary resource, a switchover can be scheduled to occur at a lull in operation instead of occurring due to failure during a critical operation.

With reference now to FIG. 1, a block diagram of an exemplary local area network (LAN) 100 upon which the method and system for selecting a primary resource in a redundant subsystem can be utilized is shown in accordance with embodiments of the present invention. It is appreciated that LAN 100 can include elements in addition to those shown (e.g., more racks, computers, switches and the like), and can also include other elements not shown or described herein. Furthermore, the blocks shown by FIG. 1 can be arranged differently than that illustrated, and can implement additional functions not described herein. Although a LAN is described herein, embodiments of the present invention are well suited for utilization with other types of networks and internal/external devices that are connected via forms of 'communications networks' and busses such as circuit boards or application specific integrated circuits (ASICs) as described in FIG. 2. For example, in one embodiment, the network includes a storage array. In another embodiment, the network also includes a storage area network (SAN). In yet another embodiment, the network includes a LAN, a SAN and a storage array. The present FIG. 1 is merely one of a plurality of possible network configurations that are within the scope of the network environment shown for purposes of clarity.

In the present embodiment, LAN 100 includes a number of switches 111 through 116, and a number of computers 130-138 that are coupleable to the switches 111-116. Typically, the computers 130-138 are stored in computer racks 120, 121 and 122, although this may not always be the case. In this embodiment, the switches and computer systems are shown as being interconnected using cables or the like. However, wireless connections between devices in LAN 100 are also contemplated.

In one embodiment, the switches 111-116 are capable of being programmed or configured such that LAN 100 is logically separated into a number of VLANs. The programming or configuring of these switches can be changed, thereby changing the resources allocated to the various VLANs. For example, by changing the configuration of switch 114, computer system 130 can be "virtually moved" from one VLAN to another. The allocation and reallocation of resources between VLANs is one of the valuable operations performed after the actual physical building of the network structure.

In addition to computer systems and switches, LAN 100 can include other types of devices such as, but not limited to, routers, load balancers, firewalls, and hubs. These other types of devices may also be programmable or configurable.

Figure 2:
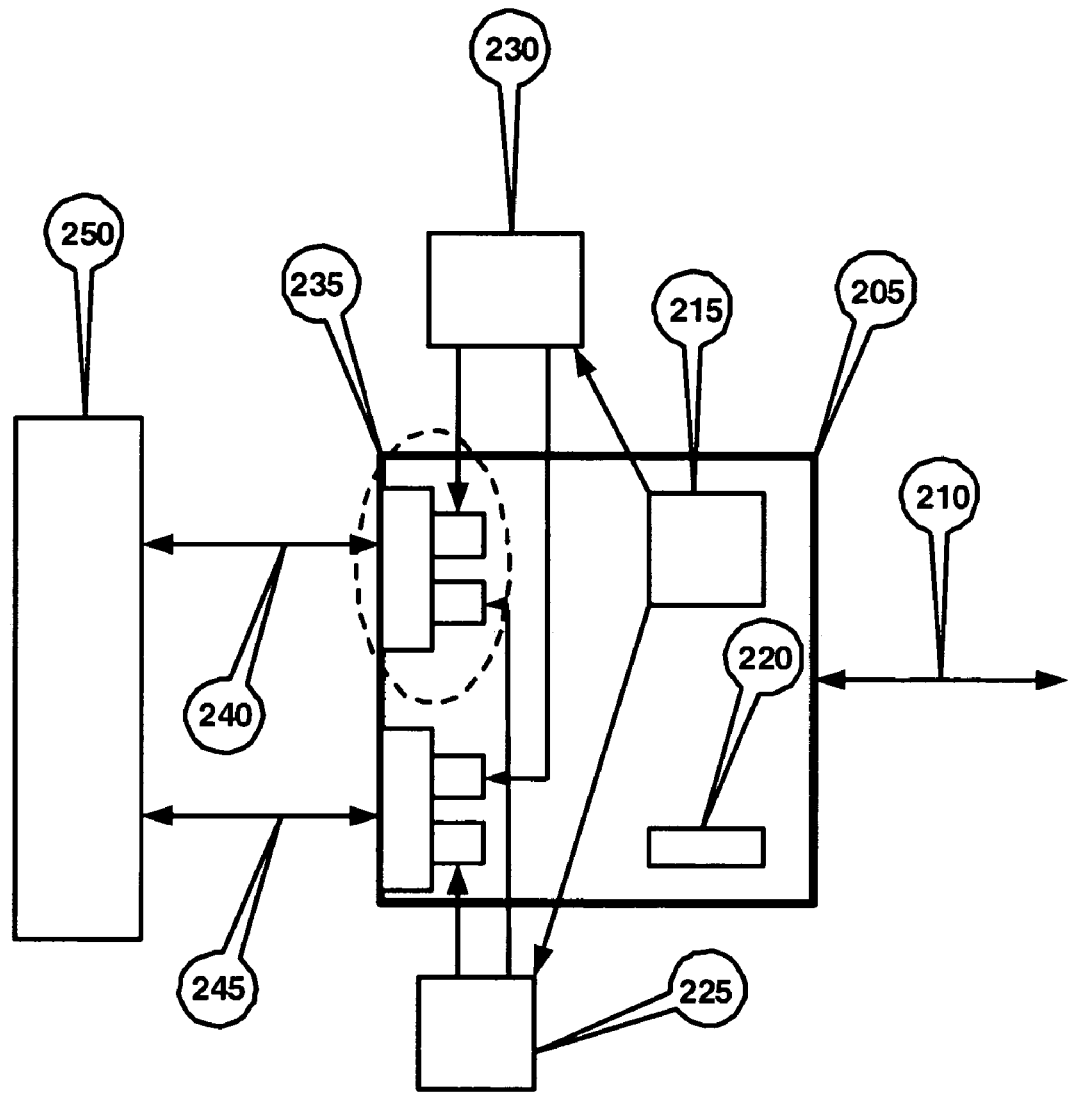
FIG. 2 is a block diagram of an exemplary chip or circuit board upon which embodiments of the present invention can be implemented.

With reference now to FIG. 2, an embodiment for selecting a primary resource in a redundant subsystem of an ASIC or circuit board is shown. In general, FIG. 1 and FIG. 2 are utilized to show that embodiments are capable of being utilized on a large scale such as LAN 100 and on a smaller scale such as the system 200 containing ASIC or circuit board 205 (referred to herein as ASIC 205 for purposes of clarity and brevity).

In one embodiment, system 200 includes ASIC 205, a communications interface 210, a primary path selection state machine 215, an error log 220, a programmable frequency source 225, a programmable voltage source 230, a communications link driver block 235, redundant communications links 240 and 245 and a variable system resource 250. The variable system resource can be a memory, a central processing unit (CPU), a disk array, a generic device, or the like.

In one embodiment, a plurality of the resources of system 200 described herein is shown as being located on ASIC 205. However, in another embodiment, resources of the system 200 may be in locations separate from ASIC 205. For example, the error log 220 in one embodiment is found in system resource 250. In yet another embodiment, the resources, such as programmable voltage source 230 and programmable frequency source 225 are utilized for a plurality of systems 200 and are not provided at an individual system 200 basis.

In general, communications interface 210 provides an interface between the ASIC 205 and the rest of the system 200 resources (not shown for purposes of brevity and clarity). The system 200 uses this interface to, amongst other things, program the ASIC 205 to perform the primary path selection. However, in another embodiment, the system 200 uses this interface to program the ASIC 205 to test the redundant subsystem resources prior to the system 200 selecting the primary path based on the results of the testing.

The primary path selection state machine 215 performs the testing of the redundant subsystem resources. The error log 220 is utilized to store the results of the testing performed by the primary path selection state machine 215 as well as any other performance or state information related to the redundant resources. The programmable voltage source 230 is capable of raising or lowering the voltage provided to the resource during testing and the programmable frequency source 225 raises or lowers the clock frequency provided to the resource during the testing process. Each of the redundant communications links 240 and 245 include a communications link driver 235. Although the redundant subsystem of system 200 is shown as a communications link, the redundant subsystem may be any portion of a chip, system, network or the like which has redundant or selectable resources.

Operation

Figure 3:
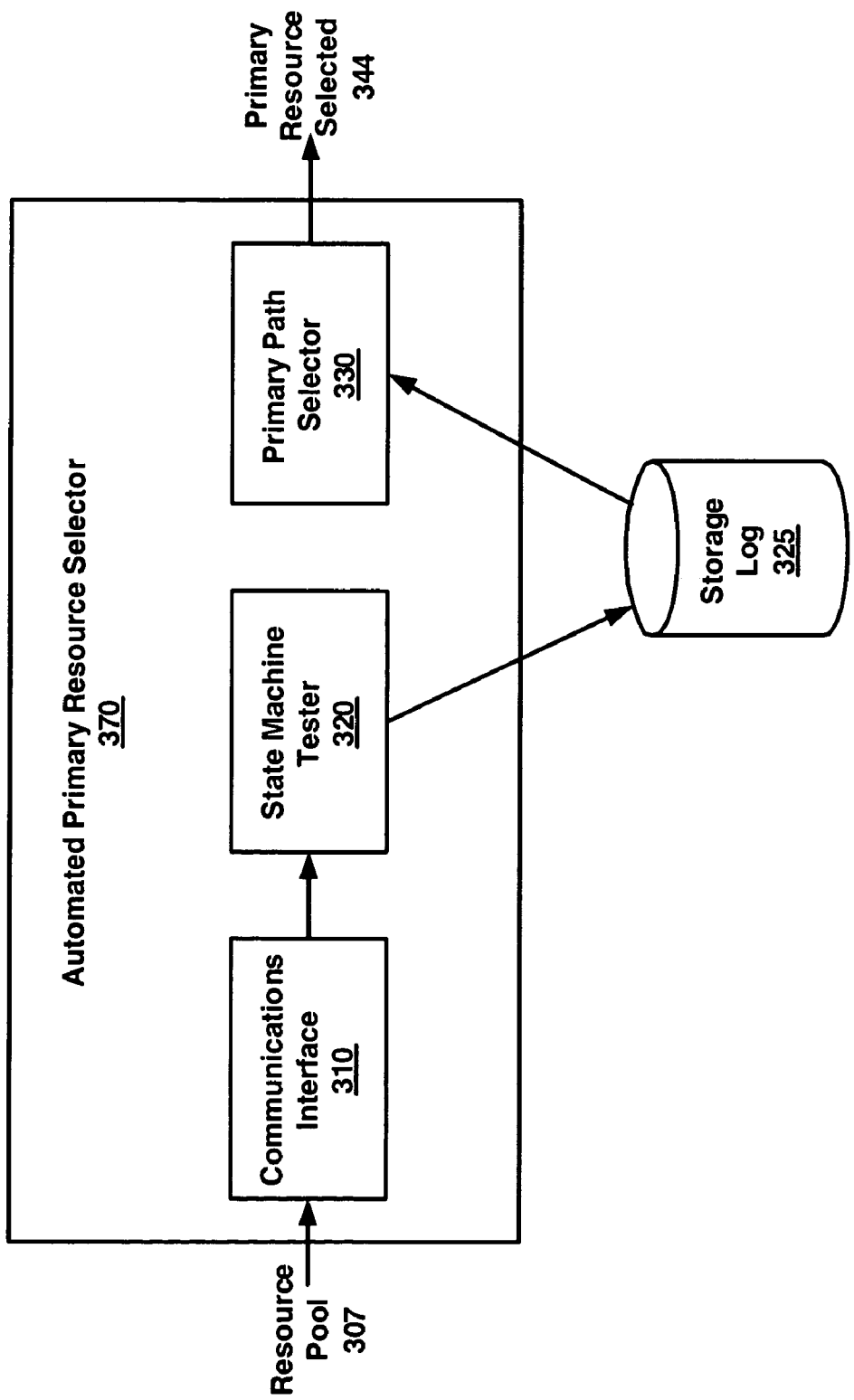
FIG. 3 is a block diagram of an exemplary automated primary resource selector in accordance with one embodiment of the present invention.

With reference now to FIG. 3, a block diagram of an exemplary automated primary resource selector 375 is shown in accordance with one embodiment of the present invention. In one embodiment, the automated primary resource selector 370 includes a communications interface 310, a state machine tester 320 and a primary path selector 330. In one embodiment, the automated primary resource selector 370 includes a storage log 325. In another embodiment, the storage log 325 is accessed by the automated primary resource selector 370 but is located outside of the automated primary resource selector 370. As described in detail herein, a resource pool 307 containing a plurality of resources is provided to the automated primary resource selector 370 for testing and a primary resource is selected 344 from the resource pool 307 based on the results of the testing.

Figure 4:
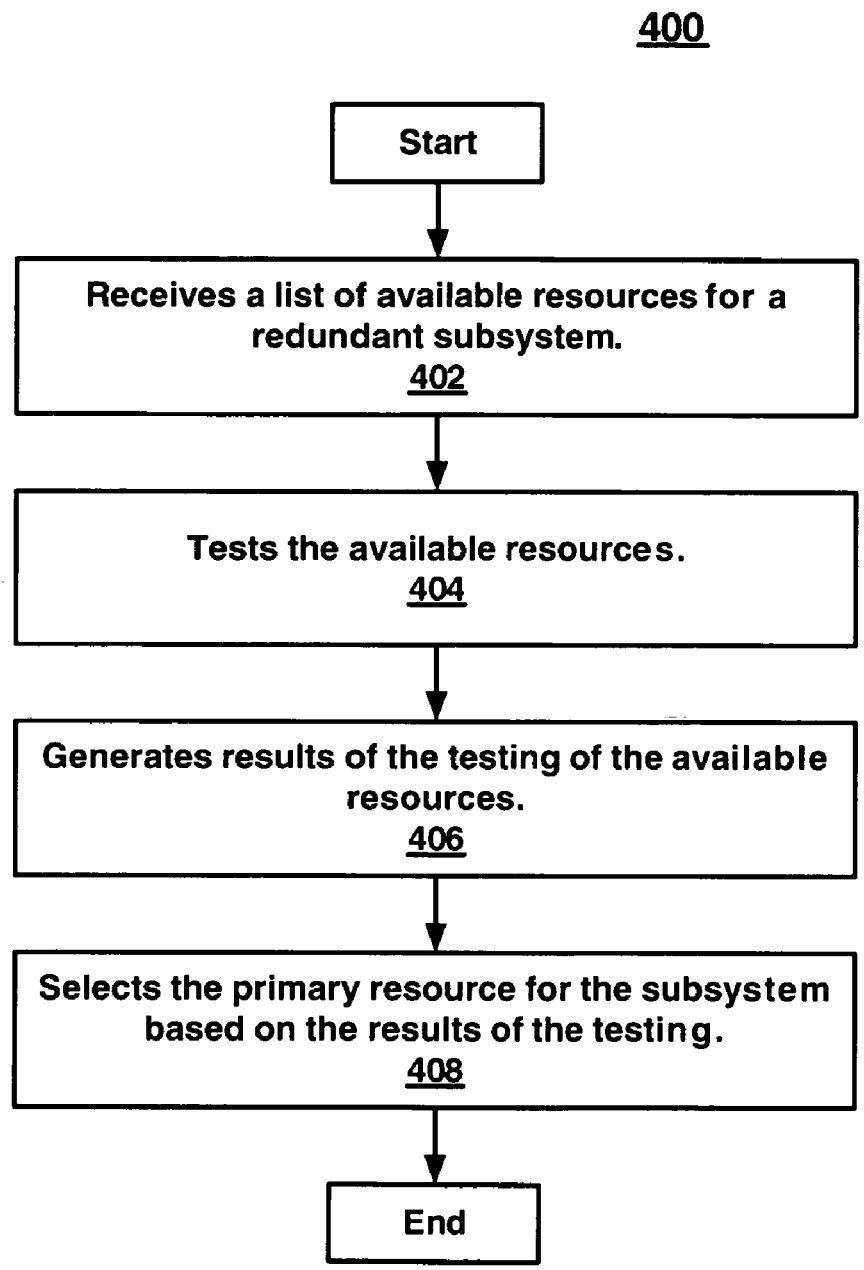
FIG. 4 is a flowchart of an exemplary method for selecting a primary resource in a redundant subsystem in accordance with one embodiment of the present invention.

Referring now to FIG. 4, a flowchart of a method for selecting a primary resource in a redundant subsystem is shown in accordance with one embodiment of the present invention. The redundant subsystem may be a portion of a network such as LAN 100 or a portion of a chip or circuit board such as ASIC 205.

With reference now to 402 of FIG. 4, and to FIG. 2, one embodiment receives a list of available resources for a redundant subsystem. For example, as shown in FIG. 2, the redundant subsystems are communication links such as 240 and 245. The redundancy of the subsystem may be due to the importance of the operation, e.g., communications, for the system, or may be due to a system having access to, and selecting from, a pool of resources such as the LAN and VLAN described herein.

Referring now to 404 of FIG. 4 and to FIG. 2, one embodiment tests the available resources, e.g., redundant communication links 240 and 245. One exemplary embodiment for testing the redundant resources is described in detail in Flowchart 500 of FIG. 5. For example, instead of the system just arbitrarily selecting communication link 240 as the primary communications link without providing any actual operating information about link 240, embodiments will evaluate both redundant resources 240 and 245. In so doing, the testing will provide information about both resources, e.g., 240 or 245, and will further provide the capability for comparing the operational characteristics of both resources and selecting the primary resource based on the capability comparison.

Figure 5:
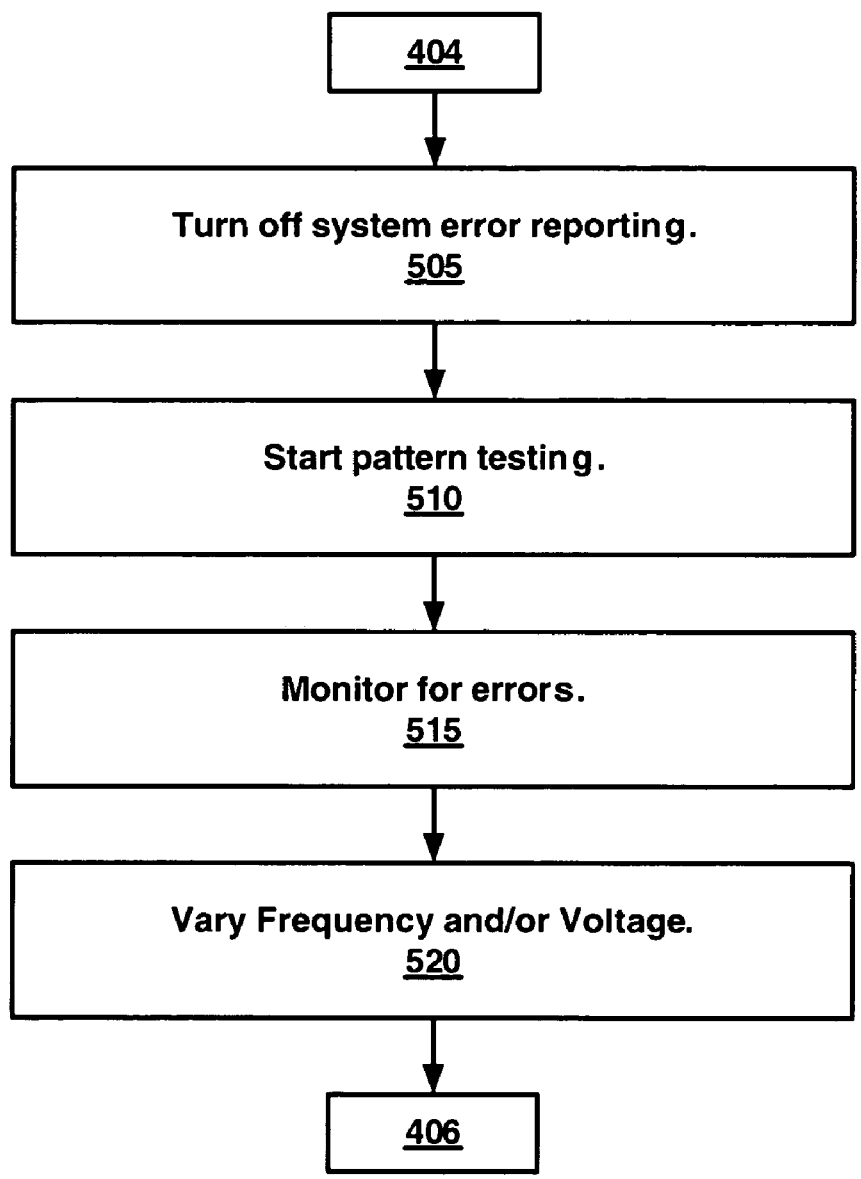
FIG. 5 is a flowchart of an exemplary method for testing resources in a redundant subsystem in accordance with one embodiment of the present invention.

With reference now to 505 of FIG. 5 and to FIG. 2, in one embodiment error reporting to the system is turned off. That is, since each of the redundant resources (e.g., 240 and 245) will be tested with varying voltage and clock frequency, and in some cases to failure, the system should not be concerned or evaluate the resources based on failure during testing. In other words, if the testing is performed until failure and the failure is reported to the system, the system will incorrectly document a resource failure during operation, when the failure actually occurred during a forced failure test.

Referring now to 510 of FIG. 5 and to FIG. 2, one embodiment begins the pattern testing. As described herein, in one embodiment, the system 200 will inform the ASIC 205 to initiate the test. In another embodiment, the system resource 250 will inform the ASIC 205 to initiate the test. In yet another embodiment, the ASIC 205 will self-initiate the test. As described herein, the test will be performed at system boot, at specified times throughout system operation (e.g., every month, semi-annually, annually, and the like), when a new resource is added to the pool of redundant resources, and the like.

With reference now to 515 of FIG. 5 and to FIG. 2, one embodiment starts monitoring the interfaces (e.g., 240-250 and 245-250) for errors. In addition, the errors are stored in error log 220. As stated herein, the error log (or storage log 325 of FIG. 3) may be a part of the ASIC 205 or may be a database located in a different part of system 200 such as system resource 250.

Generally, the monitoring for errors will continue throughout the testing phase including the applied variations in voltage and frequency. However, in one embodiment, the monitoring is initially started prior to any outside voltage and/or frequency variations to establish a baseline. In other words, by initially monitoring the operation of both redundant subsystem resources 240 and 245 under standard operating conditions, a reduced capacity or functionality may be realized. In that case, there is no need to further evaluate the resources 240 and 245 since only one is operating at the appropriate level.

Referring now to 520 of FIG. 5 and to FIG. 2, one embodiment tests the redundant resources by varying frequency and/or voltage. For example, the voltage may be varied from low to high at the redundant resources by programming (either analog or digital) voltage source 230. In another embodiment, the frequency is varied from low to high at the redundant resources by programming (either analog or digital) frequency source 225. The testing cycle can include either just the testing of voltage variation, or frequency variation, or a combination of both voltage and frequency variations. These testing cycle selections can be based on previous operational conditions, previous failures, assumed operational shortcomings, user defined preferences, or the like.

In one embodiment, the voltage variation is performed until failure of any or all of the redundant subsystem resources. For example, if five redundant resources are being tested, the testing may be performed until four of the five resources have failed. In another embodiment, the testing will continue until all five resources fail.

In another embodiment, the testing may occur until only one of the devices left in the running for primary resource remains operational. For example, if five resources (1-5) are initially tested and during the normal operation test and resource 4 is recognized as operating below standard levels, then, if during the low voltage test resources 4 and 5 remain operational the test can be stopped since resource 4 has already been removed from contention for the primary resource allocation.

With reference now to 406 of FIG. 4 and to FIG. 2, one embodiment generates results of the testing of the available resources. In one embodiment, the results are generated by accessing the error log 220 and utilizing the information stored therewith to perform a comparison of the operation of each available resource. For example, each resource will have accompanying data regarding standard operation, high voltage operation, low voltage operation, high frequency operation, low frequency operation, the combinations of each, and the like.

Referring now to 408 of FIG. 4 and to FIG. 2, one embodiment selects the primary resource for the subsystem based on the results of the testing. For example, if resource 240 had an overall operation that was higher than that of resource 245, then resource 240 would be selected as the primary communication link for the ASIC 205. In another embodiment, if the resource 240 had an overall operation that was better than that of resource 245, but resource 245 was better at a specified testing format (e.g., higher voltage) then resource 245 would be selected as the primary communication link for the ASIC 205. In other words, the testing covers a plurality of setups and the results of the testing can be evaluated based on any one, a plurality of, or all of the results. That is, the embodiments described herein are infinitely variable based on observed operation, supposed errors, operational assumptions, desired set-up, and the like. In other words the testing and evaluation are modifiable based on user preference, system preference, and the like.

Embodiments further provide best resource determination at scheduled run times (e.g., a second evaluation of the same resources), when a new resource is added to the system, based on user preference, and the like. For example, the resources within the system may be re-evaluated at any time. By allowing resource evaluation during runtime, the system ensures the best resource is utilized as the primary resource. Moreover, if the primary resource selected at boot time, or at a previous run time evaluation, is no longer the highest operating resource, a scheduled resource switchover can occur which will reduce the potential for switchover occurring during critical run time. For example, selectively swapping the primary resource for a secondary resource when the results of the second testing of the available resources shows that the secondary resource is operating at a higher quality than the primary resource.

Therefore, unlike static determination at system boot, the run time evaluation and scheduled switchover allows the primary resource to be switched as the quality of resources change during runtime. For example, during runtime the resources 240 and 245 are evaluated. At that time, it is apparent that primary resource 245 is running at a reduced rate in comparison with resource 245. A scheduled switchover will then select resource 245 to become the primary resource. In so doing, a degraded resource, e.g., resource 240, is recognized and replaced prior to the system being detrimentally affected by slowing or failure of the primary resource 240.

Thus, embodiments of the present invention provide methods and systems for selecting a primary resource in a redundant subsystem. Furthermore, embodiments assure that the best resource is chosen as the primary resource. In addition, embodiments, provide highly accurate data based on actual in system resource testing. Embodiments further provide best resource determination at system boot, scheduled runtimes, new resource addition, user preference, and the like. Additionally, by allowing primary resource evaluation during runtime, the evaluation of the highest quality resource allows a system to ensure that the best resource is the primary resource. Moreover, if the primary resource is no longer the highest operating resource, a scheduled resource switchover can occur which will reduce the potential for switchover occurring during critical run time. Embodiments also provide the testing of specific features and to failure of the resources to allow determination of the best quality primary resource.

Embodiments of the present invention are thus described. While the present invention has been described in particular embodiments, it should be appreciated that the present invention should not be construed as limited by such embodiments, but rather construed according to the following claims.

We claim:

1. A method for selecting a primary resource in a redundant subsystem, said method comprising:
receiving a list of available resources for a redundant subsystem;
testing said available resources, wherein testing of said available resources is selected from the testing methods including: operation under higher voltage, operation under lower voltage, operation at higher clock frequency, and operation at lower clock frequency;
generating results of said testing of said available resources;
selecting the primary resource for said subsystem based on the results of said testing.

2. The method of claim 1 further comprising:
performing said testing of said available resources during system boot.

3. The method of claim 1 further comprising:
performing said testing of said available resources during runtime.

4. The method of claim 1 further comprising:
performing a second testing of said available resources when a new resource is added to said list of available resources for a subsystem;
generating results of said second testing; and
selecting the primary resource for said subsystem based on said results of said second testing.

5. The method of claim 4 further comprising:
selectively swapping said primary resource for a secondary resource when said results of said second testing of said available resources shows that said secondary resource is operating at a higher quality than said primary resource.

6. The method of claim 1 further comprising:
performing a second testing of said available resources after a pre-defined time period;
generating results of said second testing; and
selecting the primary resource for said subsystem based on said results of said second testing.

7. The method of claim 6 further comprising:
selectively swapping said primary resource for a secondary resource when said results of said second testing of said available resources shows that said secondary resource is operating at a higher quality than said primary resource.

8. The method of claim 1 further comprising:
performing said testing on each of said available resources until failure of all but one of said available resources.

9. An automated primary resource selector for a redundant subsystem comprising:
a communications interface for receiving a list of available resources for a redundant subsystem;
a state machine tester for testing said available resources, wherein testing of said available resources is selected from the testing methods including: operation under high voltage, operation under lower voltage, operation at higher clock frequency, and operation at lower frequency;
a storage log for storing results of said testing of said available resources;
a primary path selector for selecting the primary resource for said subsystem based on the results of said testing.

10. The automated primary resource selector of claim 9 wherein said testing of said available resources is performed during system boot.

11. The automated primary resource selector of claim 9 wherein said testing of said available resources is performed during runtime.

12. The automated primary resource selector of claim 9 wherein said state machine tester performs a second testing of said available resources when a new resource is added to said list of available resources for a subsystem;
said storage log stores results of said second testing; and
said primary path selector selects the primary resource for said subsystem based on said results of said second testing.

13. The automated primary resource selector of claim 12 wherein said primary resource is selectively swapped for a secondary resource when said results of said second testing of said available resources shows that said secondary resource is operating at a higher quality than said primary resource.

14. The automated primary resource selector of claim 9 wherein said state machine tester performs a second testing of said available resources after a pre-defined time period;
said storage log stores results of said second testing; and
said primary path selector selects the primary resource for said subsystem based on said results of said second testing.

15. The automated primary resource selector of claim 14 wherein said primary resource is selectively swapped for a secondary resource when said results of said second testing of said available resources shows that said secondary resource is operating at a higher quality than said primary resource.

16. The automated primary resource selector of claim 9 wherein said testing is performed on each of said available resources until failure of all but one of said available resources.

17. A computer-usable medium having computer-readable program code embodied therein for causing a method for selecting a primary resource in a redundant subsystem, said method comprising:
receiving a list of available resources for a redundant subsystem;
testing said available resources, wherein testing of said available resources is selected from the testing methods including: operation under higher voltage, operation under lower voltage, operation at higher clock frequency, and operation at lower clock frequency;
generating results of said testing of said available resources;
selecting the primary resource for said subsystem based on the results of said testing.

18. The computer-usable medium of claim 17 further comprising:
performing said testing of said available resources during system boot.

19. The computer-usable medium of claim 17 further comprising:
performing said testing of said available resources during runtime.

20. The computer-usable medium of claim 17 further comprising:
performing a second testing of said available resources when a new resource is added to said list of available resources for a subsystem;
generating results of said second testing; and
selecting the primary resource for said subsystem based on said results of said second testing.

21. The computer-usable medium of claim 20 further comprising:
selectively swapping said primary resource for a secondary resource when said results of said second testing of said available resources shows that said secondary resource is operating at a higher quality than said primary resource.

22. The computer-usable medium of claim 17 further comprising:
performing a second testing of said available resources after a pre-defined time period;
generating results of said second testing; and
selecting the primary resource for said subsystem based on said results of said second testing.

23. The computer-usable medium of claim 22 further comprising:
selectively swapping said primary resource for a secondary resource when said results of said second testing of said available resources shows that said secondary resource is operating at a higher quality than said primary resource.

24. The computer-usable medium of claim 17 further comprising:
performing said testing on each of said available resources until failure of all but one of said available resources.

* * * * *

UNITED STATES PATENT AND TRADEMARK OFFICE
CERTIFICATE OF CORRECTION

PATENT NO. : 7,596,726 B2  Page 1 of 1
APPLICATION NO. : 11/263431
DATED : September 29, 2009
INVENTOR(S) : Ken Gary Pomaranski et al.

It is certified that error appears in the above-identified patent and that said Letters Patent is hereby corrected as shown below:

In column 8, line 53, in Claim 9, delete "high" and insert -- higher --, therefor.

In column 8, line 54, in Claim 9, after "lower" insert -- clock --.

Signed and Sealed this

Twenty-second Day of June, 2010

David J. Kappos
*Director of the United States Patent and Trademark Office*